United States Patent
Yamazaki et al.

(10) Patent No.: US 11,759,297 B2
(45) Date of Patent: Sep. 19, 2023

(54) REFERENCE DENTURE ALIGNMENT JIG, KIT FOR PREPARING DENTURES, AND METHOD FOR PREPARING DENTURES USING SAME

(71) Applicant: TOKUYAMA DENTAL CORPORATION, Tokyo (JP)

(72) Inventors: Tatsuya Yamazaki, Tokyo (JP); Kei Nakashima, Tokyo (JP); Youichi Yamamoto, Yokohama (JP); Hitoshi Motohashi, Yokohama (JP)

(73) Assignee: TOKUYAMA DENTAL CORPORATION, Tokyo (JP)

( * ) Notice: Subject to any disclaimer, the term of this patent is extended or adjusted under 35 U.S.C. 154(b) by 0 days.

(21) Appl. No.: 16/611,699

(22) PCT Filed: May 10, 2018

(86) PCT No.: PCT/JP2018/018096
§ 371 (c)(1),
(2) Date: Nov. 7, 2019

(87) PCT Pub. No.: WO2018/207867
PCT Pub. Date: Nov. 15, 2018

(65) Prior Publication Data
US 2021/0137652 A1    May 13, 2021

(30) Foreign Application Priority Data
May 10, 2017    (JP) .................. 2017-093810

(51) Int. Cl.
*A61C 13/07*    (2006.01)
*A61C 13/271*   (2006.01)
(Continued)

(52) U.S. Cl.
CPC .......... *A61C 11/001* (2013.01); *A61C 11/006* (2013.01); *A61C 13/0001* (2013.01);
(Continued)

(58) Field of Classification Search
CPC ... A61C 19/05; A61C 19/045; A61C 13/0025; A61C 13/26; A61C 13/0024;
(Continued)

(56) References Cited

U.S. PATENT DOCUMENTS 3,464,111 A * 9/1969 Gillard ............... A61C 13/0003
                                                    433/171
RE27,847 E * 12/1973 Jankelson ............. A61C 19/05
                                                    433/140
(Continued)

FOREIGN PATENT DOCUMENTS

JP    54-012292 U    1/1979
JP    H04-218151 A   8/1992
(Continued)

OTHER PUBLICATIONS

Machine translation of JPH08280712 (Year: 1996).*
(Continued)

*Primary Examiner* — Heidi M Eide
(74) *Attorney, Agent, or Firm* — Norris McLaughlin, P.A.

(57) ABSTRACT

Provided is a reference denture alignment jig which guides reference dentures into an oral cavity or to an articulator in which upper and lower edentulous jaw models are fixed, and aligns the reference dentures in the oral cavity or in the articulator in which upper and lower edentulous jaw models are fixed, the jig having a reference denture holding portion for holding reference dentures.

3 Claims, 10 Drawing Sheets

(51) Int. Cl.
   *A61C 13/107* (2006.01)
   *A61C 13/00* (2006.01)
   *A61C 19/05* (2006.01)
   *A61C 11/00* (2006.01)

(52) U.S. Cl.
   CPC ...... *A61C 13/0024* (2013.01); *A61C 13/0025* (2013.01); *A61C 13/26* (2013.01); *A61C 19/05* (2013.01)

(58) Field of Classification Search
   CPC . A61C 13/0001; A61C 11/001; A61C 11/006; A61C 9/00; A61C 13/00; A61C 9/006
   See application file for complete search history.

(56) References Cited

U.S. PATENT DOCUMENTS

| | | | | |
|---|---|---|---|---|
| 4,059,899 | A * | 11/1977 | Dyal | A61C 13/00 433/72 |
| 4,892,480 | A * | 1/1990 | Levandoski | A61C 19/045 433/73 |
| 5,954,503 | A * | 9/1999 | Skarky | A61C 19/05 433/71 |
| 6,413,085 | B1 * | 7/2002 | Lee | A61C 9/00 433/56 |
| 2010/0075279 | A1 | 3/2010 | Ho et al. | |
| 2012/0295219 | A1 * | 11/2012 | Monteiro Geras | A61C 11/08 433/55 |
| 2013/0216972 | A1 * | 8/2013 | Kolozsvary | A61C 1/0007 433/29 |
| 2016/0158627 | A1 * | 6/2016 | Layzell | A61C 19/05 264/16 |

FOREIGN PATENT DOCUMENTS

| | | |
|---|---|---|
| JP | H08-280712 A | 10/1996 |
| JP | 2000-051239 A | 2/2000 |
| JP | 2006-305125 A | 11/2006 |
| JP | 2015-165850 A | 9/2015 |

OTHER PUBLICATIONS

International Search Report dated Jun. 18, 2018 and dated Jul. 3, 2018, in connection with PCT International Application No. PCT/JP2018/018096.

Translation of International Search Report dated Jun. 18, 2018, and dated Jul. 3, 2018, in connection with PCT International Application No. PCT/JP2018/018096.

International Preliminary Report dated Nov. 22, 2018, and dated Jan. 16, 2019, in connection with PCT International Application No. PCT/JP2018/018096.

* cited by examiner

[Fig.1]
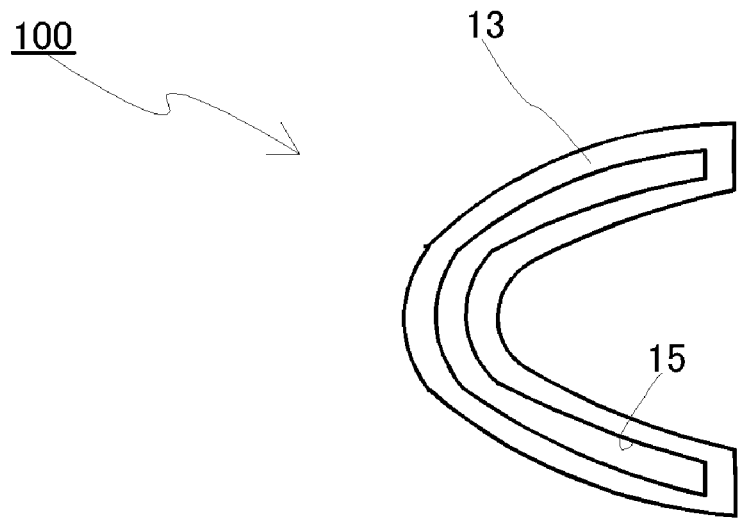
1(a)
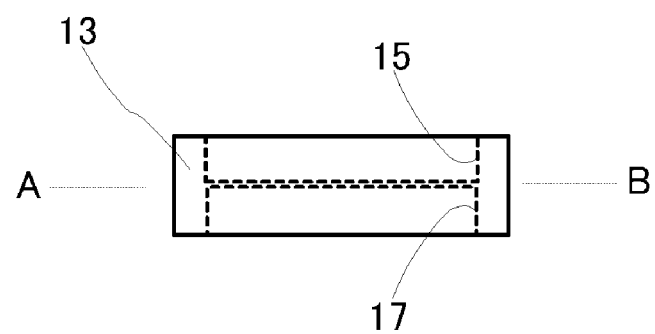
1(b)
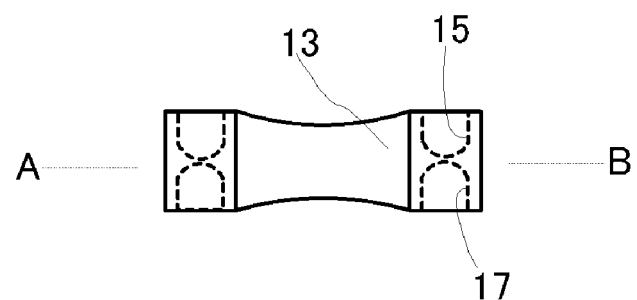
1(c)

[Fig.2]
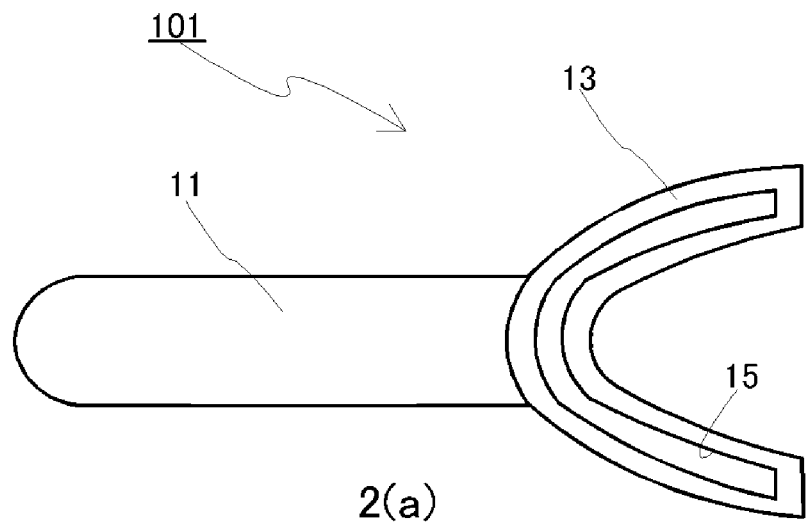
2(a)
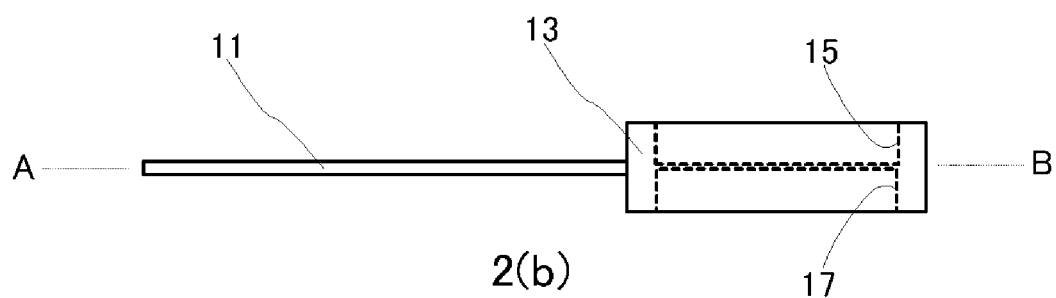
2(b)
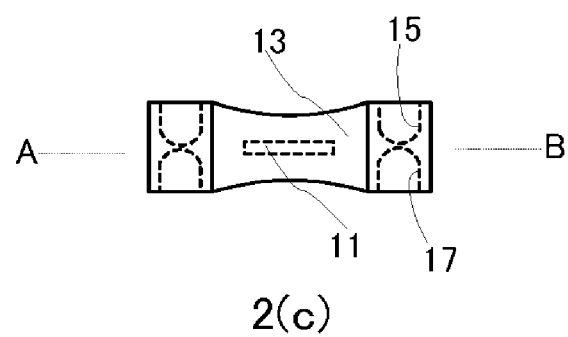
2(c)

[Fig.3]
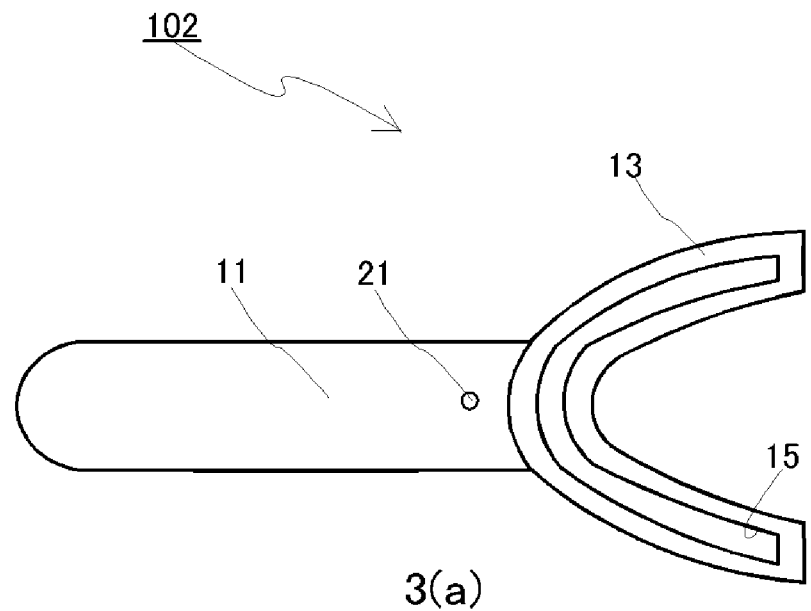
3(a)
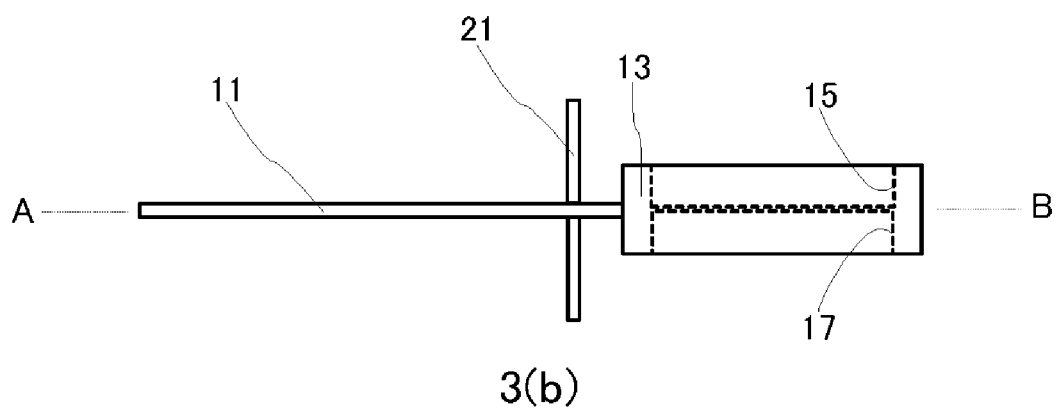
3(b)
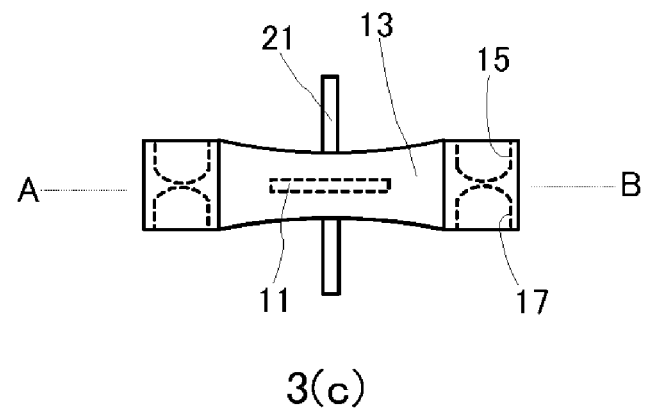
3(c)

[Fig.4]
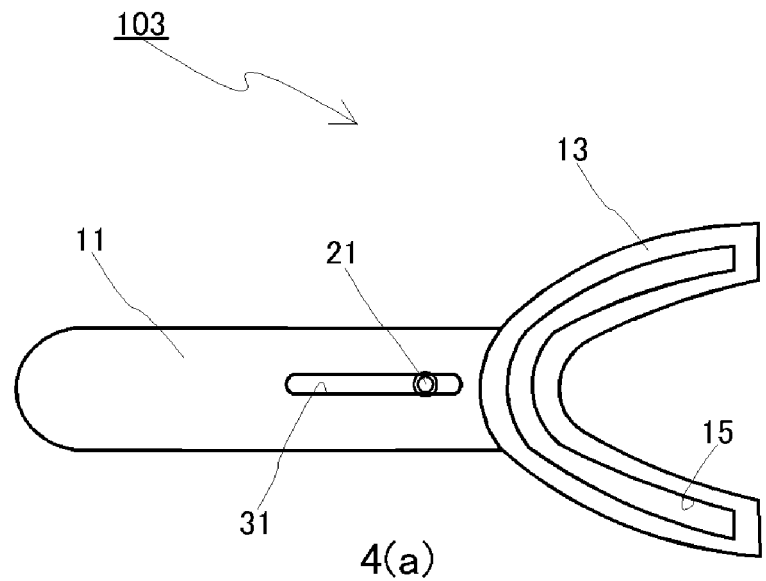
4(a)
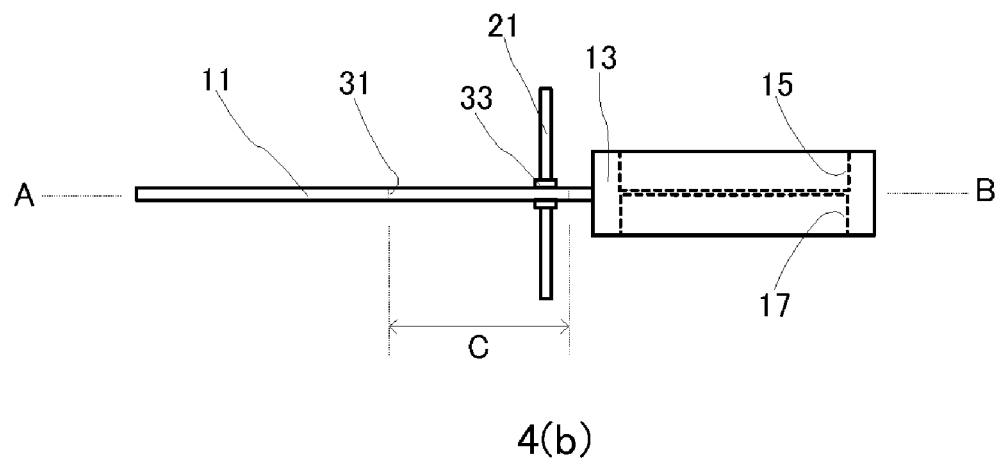
4(b)
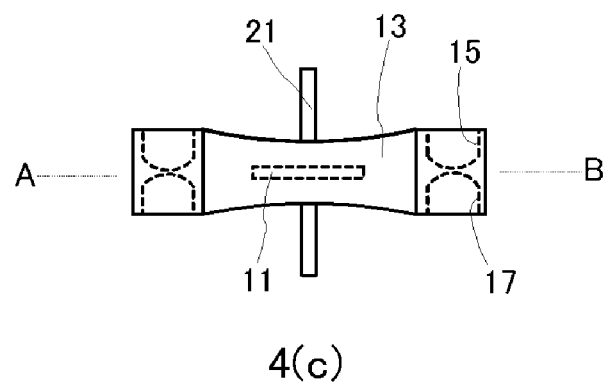
4(c)

[Fig.5]
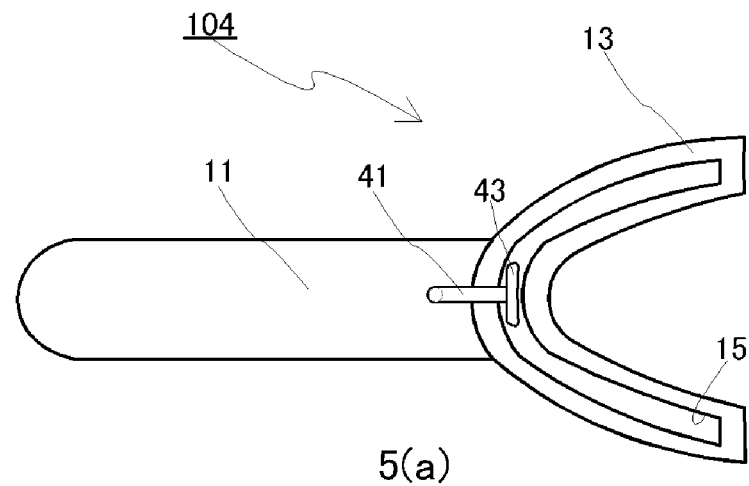
5(a)
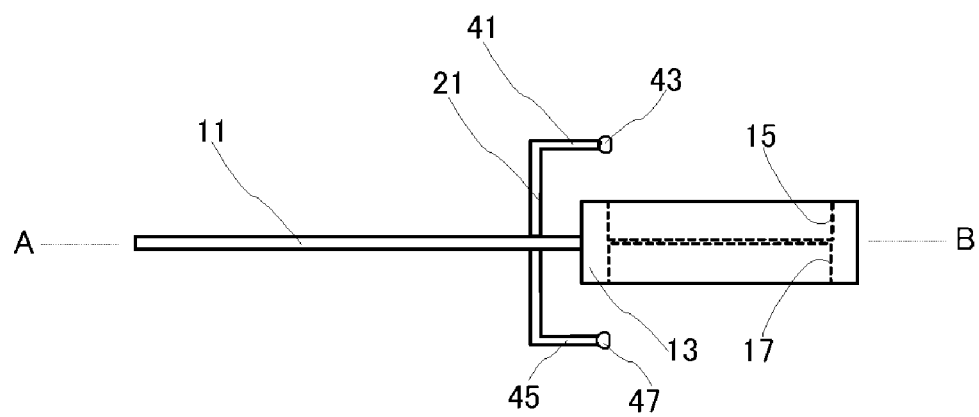
5(b)
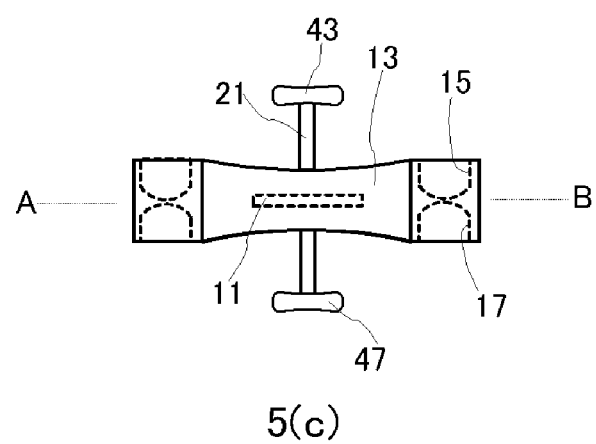
5(c)

[Fig.6]
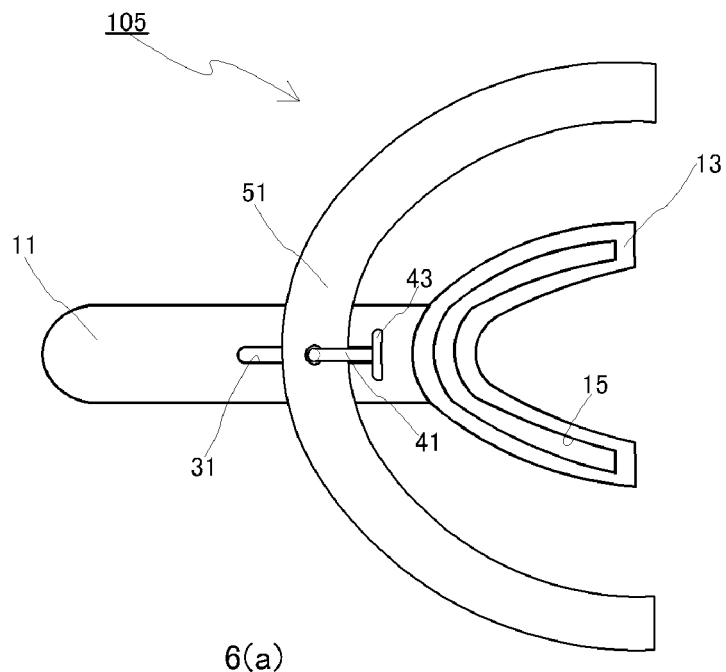
6(a)
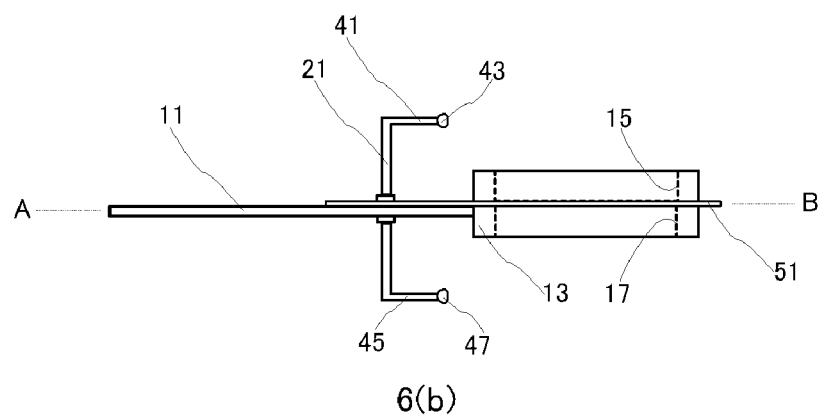
6(b)
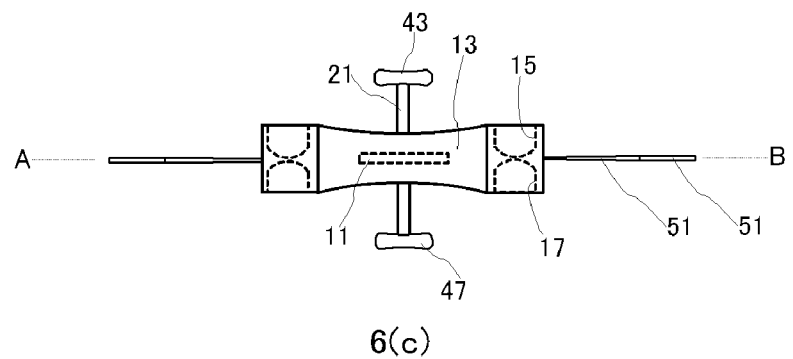
6(c)

[Fig.7]
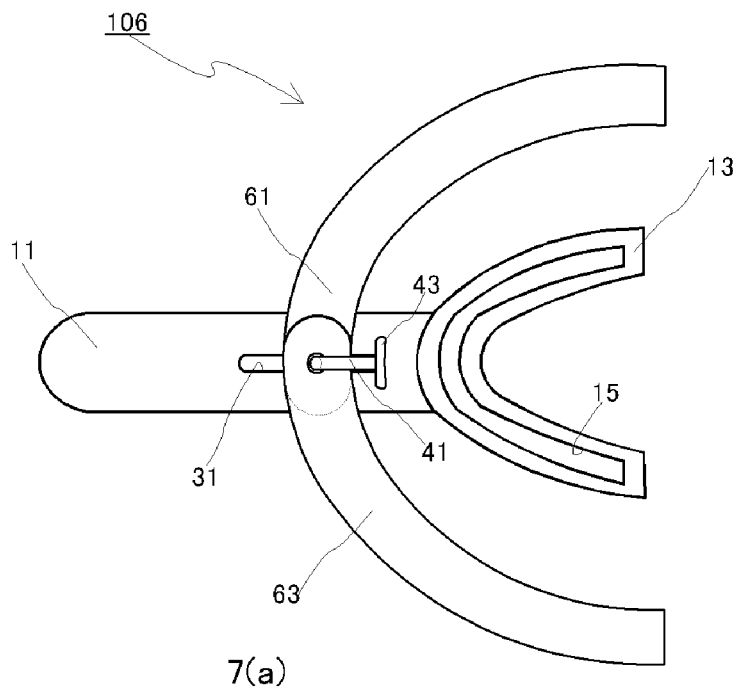
7(a)
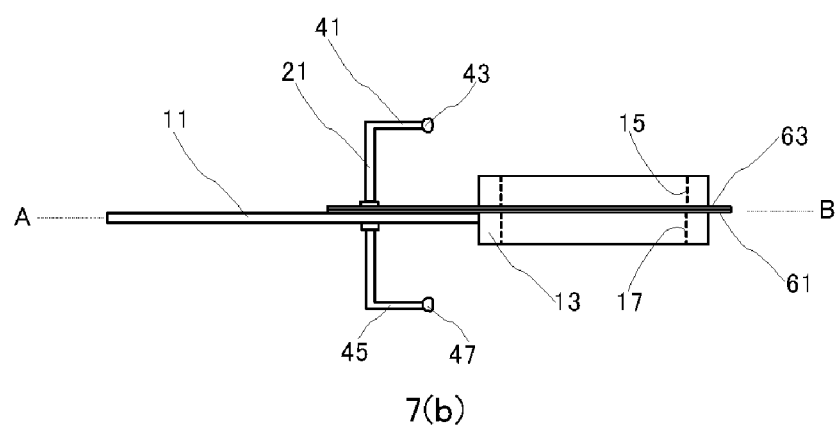
7(b)
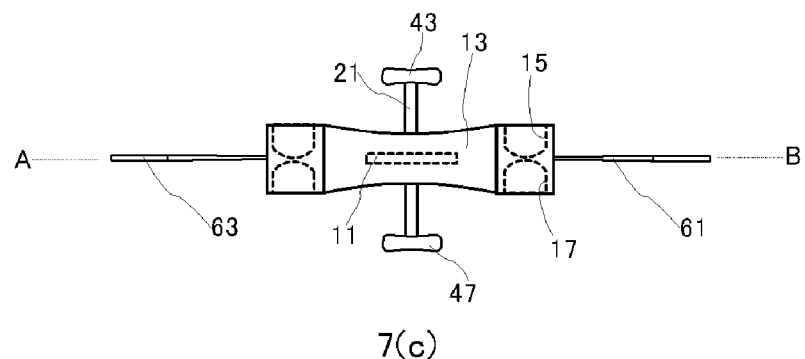
7(c)

[Fig.8]
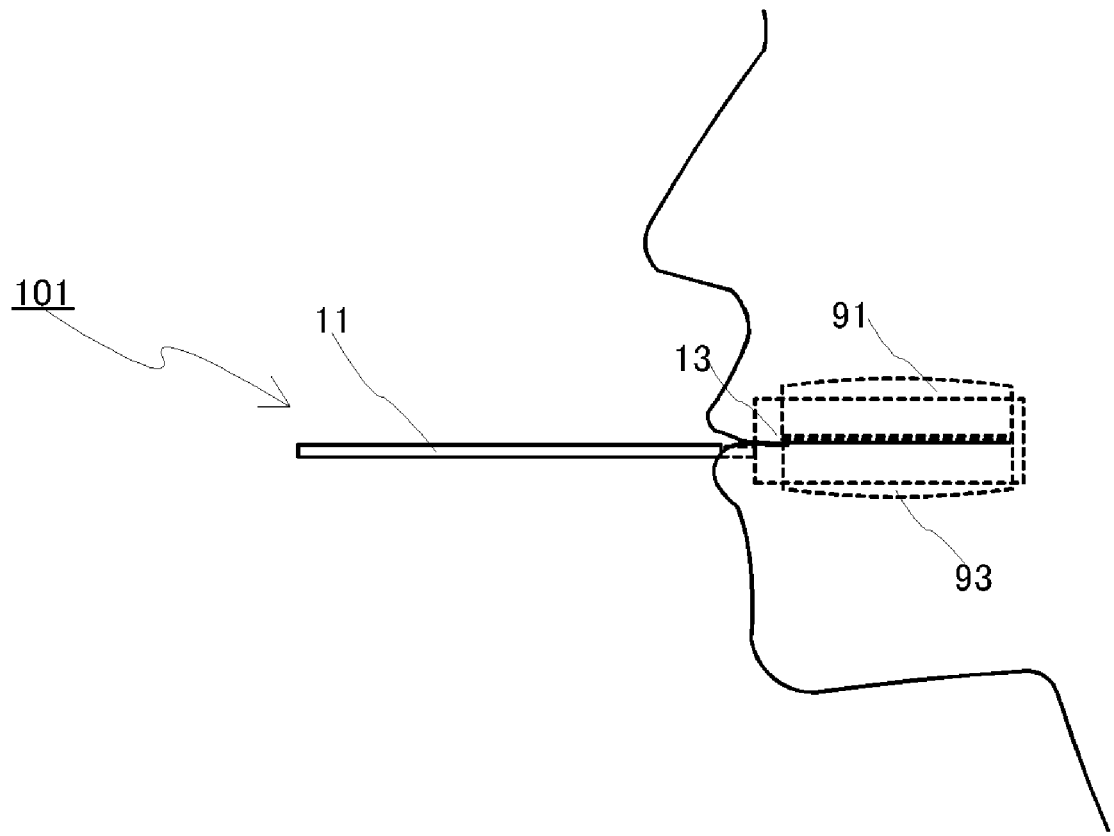
[Fig.9]
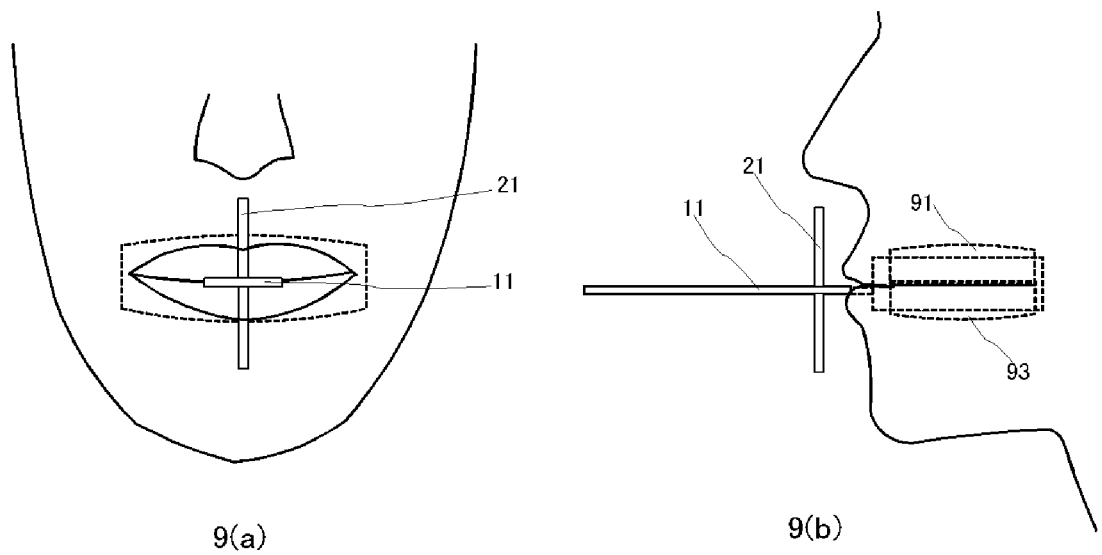
9(a)          9(b)

[Fig.10]
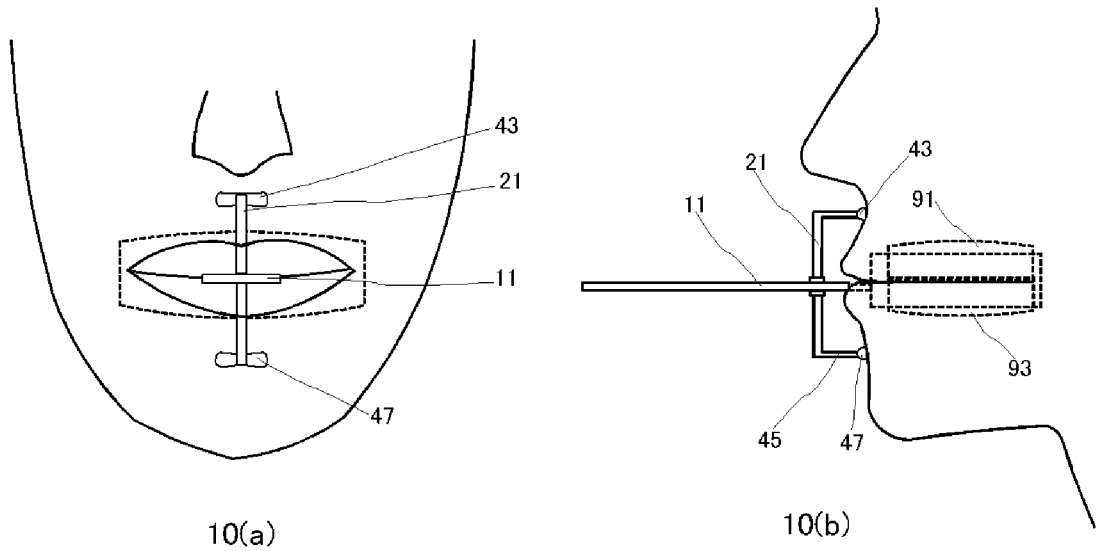
10(a)      10(b)
[Fig.11]
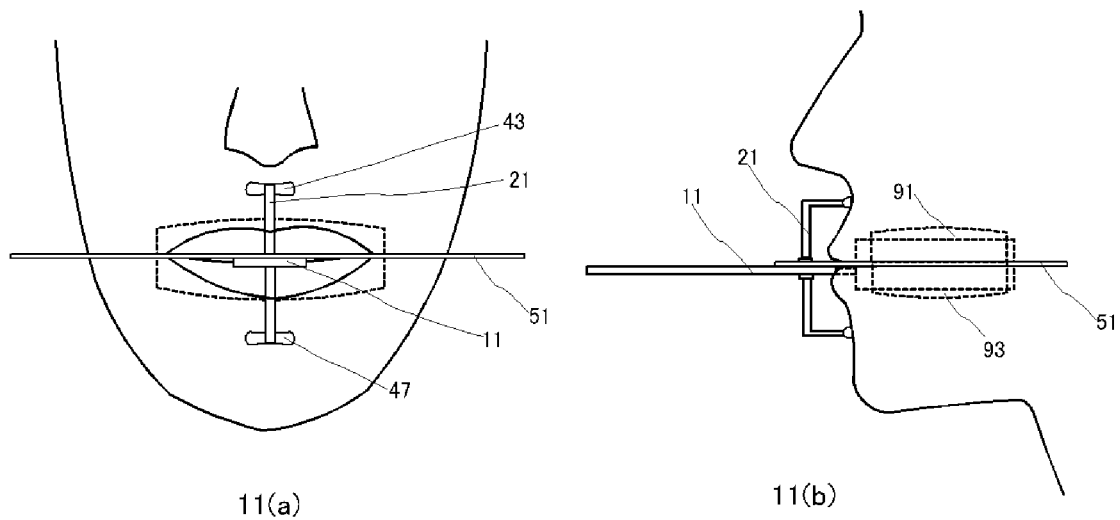
11(a)      11(b)

[Fig.12]
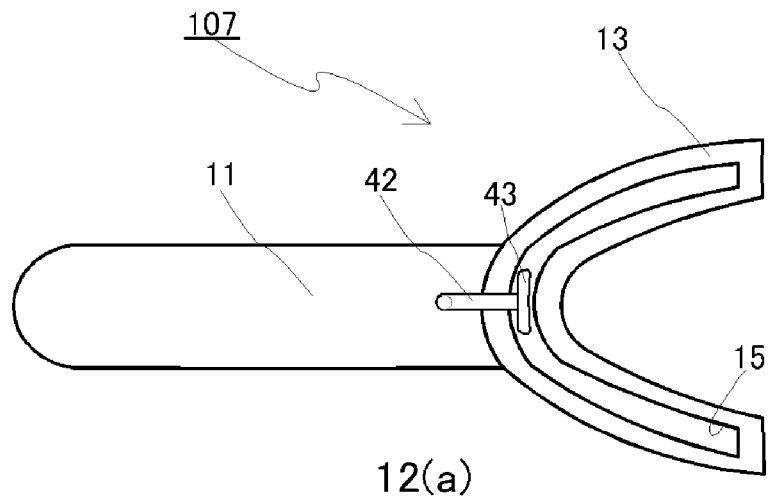
12(a)
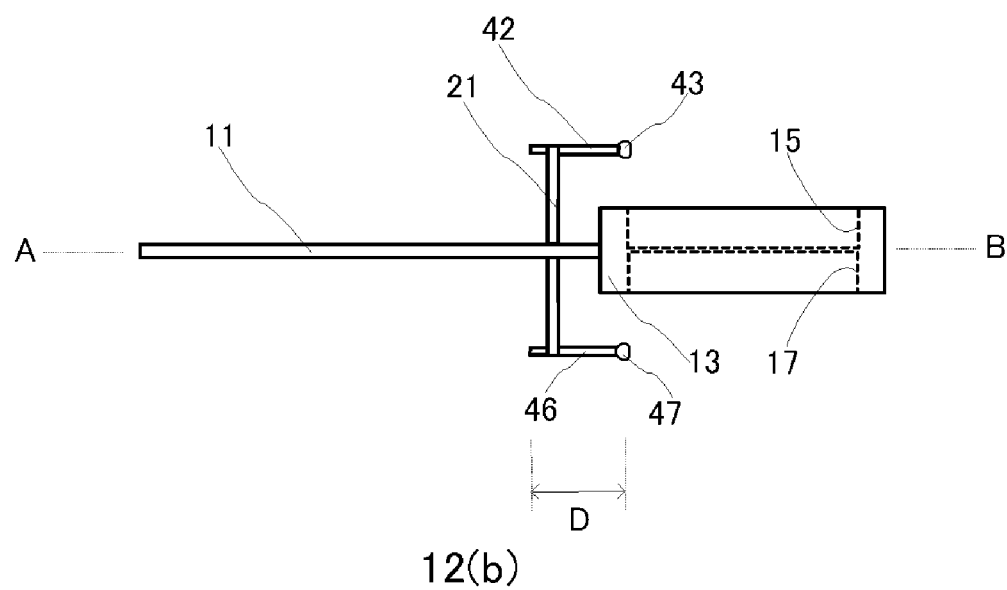
12(b)
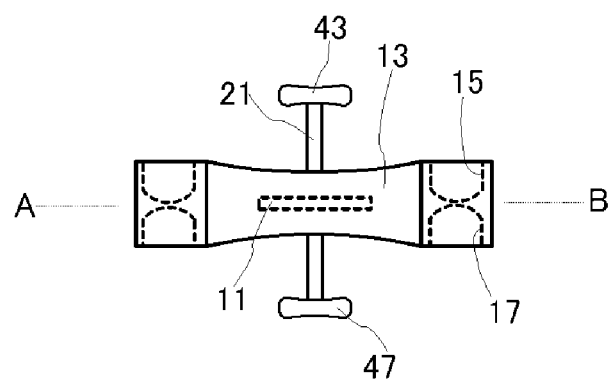
12(c)

REFERENCE DENTURE ALIGNMENT JIG, KIT FOR PREPARING DENTURES, AND METHOD FOR PREPARING DENTURES USING SAME

BACKGROUND ART

This application is a 371 application of PCT/JP2018/018096 filed May 10, 2018, which claims foreign priority benefits under 35 U.S.C. § 119 of Japanese Application No. 2017-093810 filed May 10, 2017, the disclosure of which is incorporated by reference herein in its entirety.

TECHNICAL FIELD

The present invention relates to a standard denture alignment jig, a denture preparation kit, and a method for preparing a denture using the jig and the kit. Specifically, the present invention relates to a standard denture alignment jig, a denture preparation kit, and a method for preparing a denture using the jig and the kit in order to place a standard denture in an appropriate position, for example, in the oral cavity of a patient.

In general, edentulous people have the oral cavity shaped differently from each other. For example, the size of the alveolar bone, an absorbed amount of the bone, and a state of the mucous membrane vary from individual to individual. For that reason, in order to prepare a good denture, it is required to prepare a denture from a model of each individual according to a known procedure in the related art, which takes a lot of time for preparation (customization).

In light of such a problem, a standard denture of a standardized size has been proposed in order to easily prepare a denture with a good fit (Patent Literature 1). By using a standardized standard denture and a relining material such as a hard relining material, it is possible to yield a denture with a good fit (standard denture) in a short time by intraoral relining without technical operations using a plaster model.

When a standard denture is relined intraorally, a relining material (paste) before curing is applied to an inner surface of the base of the standard denture and inserted into an oral cavity or an articulator mounted with maxillary and mandibular edentulous jaw models. Then, the relining material is fluidized, and the shape of the mucous membrane is registered on the relining material. At this time, it is required to maintain the standard denture in an appropriate position until the relining material cures. However, using only the standard denture makes it difficult to maintain the standard denture in an appropriate position and may cause a positional shift. Due to the positional shift, some people have difficulty in biting hard foods or have a temporomandibular joint pain after long-term use.

To prevent such problems, it is required to align (1) vertical positions (occlusal plane, occlusal vertical dimension), (2) horizontal positions (median line), and (3) antero-posterior positions (facial appearance), while maintaining proper occlusion of maxillary and mandibular standard dentures (a maxillary standard denture and a mandibular standard denture). This alignment requires a lot of experience and knowledge.

CITATION LIST

Patent Literature

Patent Literature 1: JP 2015-165850 A

SUMMARY OF INVENTION

Technical Problem

An object of the present invention is to provide a standard denture alignment jig that facilitates positioning of a ready-made standard denture, to which a relining material is applied, in an appropriate position, for example, in the oral cavity of a patient. Another object of the present invention is to provide a denture preparation kit that includes the standard denture alignment jig and a relining material. Still another object of the present invention is to provide a method for preparing a denture using the standard denture alignment jig.

Solution to Problem

As a result of intensive studies to solve the problems, the inventors of the present invention have found that retention of standard dentures in a jig (tray) having a predetermined structure makes it possible to maintain appropriate occlusion between maxillary and mandibular standard dentures and to place the standard dentures in predetermined positions until a relining material cures. In addition, the inventors of the present invention have found that the use of a jig having a predetermined structure enables further appropriate positioning of standard dentures, whereby completing the present invention.

The present invention has been made to solve the problems, and the details are described below. In this specification, a "standard denture" refers to an already-made denture in which artificial teeth are arranged in advance and to which a relining material is not applied. A pair of standard dentures represents a maxillary standard denture and a mandibular standard denture. A complete dentition represents a dentition including 14 teeth from the left second molar to the right second molar.

The standard denture alignment jig according to an embodiment of the present invention is applicable not only to the oral cavity of a patient (human) but also to maxillary and mandibular edentulous jaw models. A method for preparing a denture using the standard denture alignment jig according to an embodiment of the present invention is applicable to maxillary and mandibular edentulous jaw models and is not applicable to a case where the jig is directly applied to a patient (human). This specification will describe a method for preparing a denture using the standard denture alignment jig according to an embodiment of the present invention, including a case where the jig is applied directly to a patient (human).

[1] A standard denture alignment jig configured to guide standard dentures to an oral cavity or an articulator to which maxillary and mandibular edentulous jaw models are fixed and configured to align positions of the standard dentures in the oral cavity or in the articulator to which the maxillary and mandibular edentulous jaw models are fixed, wherein the standard denture alignment jig includes a standard denture retention unit that retains the standard dentures.

In this standard denture alignment jig, a pair of standard dentures is placed on the standard denture retention unit, and the pair of standard dentures is temporarily fixed on the standard denture retention unit. Accordingly, it is possible to align positions of maxillary and mandibular standard dentures while appropriately maintaining occlusion therebetween.

[2] The standard denture alignment jig according to [1], including a handle connected to the standard denture retention unit.

The handle is connected to the standard denture retention unit, and the handle enables alignment of the standard dentures.

[3] The standard denture alignment jig according to [1] or [2], wherein the standard denture retention unit or the handle includes a median guide indicating a median position of a central incisor of the standard dentures retained by the standard denture retention unit.

This standard denture alignment jig includes the median guide that indicates the median position of the central incisor as an index of alignment that is visually recognized from outside the oral cavity. This median guide enables alignment of the standard dentures.

[4] The standard denture alignment jig according to [3], wherein the median guide is a median indicating pin disposed perpendicular to an occlusal plane of the standard dentures retained by the standard denture retention unit.

This standard denture alignment jig includes the median indicating pin that indicates the median position of the central incisor as an index of alignment that is visually recognized from outside the oral cavity. Furthermore, the median indicating pin is disposed perpendicular to the occlusal plane of the standard dentures. This median indicating pin enables alignment of the standard dentures.

[5] The standard denture alignment jig according to [4], wherein the median indicating pin has a length of 30 to 60 mm.

This standard denture alignment jig includes a median indicating pin having a length of 30 to 60 mm.

[6] The standard denture alignment jig according to [4] or [5], wherein the median indicating pin is attached slidably in a direction parallel to the occlusal plane of the standard dentures retained by the standard denture retention unit.

In the standard denture alignment jig, the median indicating pin is attached slidably in a direction parallel to the occlusal plane of the standard dentures retained by the standard denture retention unit and in a direction parallel to a longitudinal direction of the handle. In other words, even when the median indicating pin slides, the median indicating pin continuously indicates the median position of the central incisor.

[7] The standard denture alignment jig according to any one of [4] to [6], wherein the median indicating pin includes a rod attached to one end or both ends of the median indicating pin in a direction orthogonal to the median indicating pin.

In this standard denture alignment jig, the median indicating pin includes the rod attached to one end or both ends of the median indicating pin in the direction orthogonal to the median indicating pin. When a tip of this rod is brought into contact with, for example, the mentolabial sulcus or the forehead, or with a corresponding member in the articulator, it is possible to determine anteroposterior positions of the standard denture.

[8] The standard denture alignment jig according to [7], wherein the rod is attached slidably in a direction parallel to the occlusal plane of the standard dentures retained by the standard denture retention unit.

In this standard denture alignment jig, the rod is attached slidably in the direction parallel to the occlusal plane of the standard dentures. Accordingly, anteroposterior positions of standard dentures are adjusted according to the size of a face.

[9] The standard denture alignment jig according to [1] or [2], including a horizontal guide indicating an occlusal plane of the standard dentures retained by the standard denture retention unit.

This standard denture alignment jig includes the horizontal guide that indicates the occlusal plane of the standard dentures as an index of alignment that is visually recognized from outside the oral cavity. This horizontal guide enables alignment of the standard dentures.

[10] The standard denture alignment jig according to [2], wherein the handle include a horizontal guide indicating an occlusal plane of the standard dentures retained by the standard denture retention unit.

This standard denture alignment jig includes the horizontal guide on the handle.

[11] The standard denture alignment jig according to [10], wherein the horizontal guide is attached slidably in a direction parallel to the occlusal plane of the standard dentures retained by the standard denture retention unit.

In this standard denture alignment jig, the horizontal guide is attached slidably in the direction parallel to the occlusal plane of the standard dentures. Accordingly, anteroposterior positions of the standard dentures are adjusted according to the size of a face.

[12] The standard denture alignment jig according to [9] or [10], wherein the horizontal guide is disposed in a rotatable manner along the occlusal plane of the standard dentures retained by the standard denture retention unit.

In this standard denture alignment jig, the horizontal guide that has, for example, a substantial U-shape or V-shape is disposed in a rotatable manner along the occlusal plane of the standard dentures retained by the standard denture retention unit. Accordingly, the width of the horizontal guide is adjusted according to the size of a face.

[13] A denture preparation kit including:
the standard denture alignment jig according to any one of [1] to [12]; and
a standard denture.

This denture preparation kit includes the standard denture alignment jig according to any one of [1] to [12]; and the standard denture having a predetermined shape. Furthermore, this denture preparation kit is used for intraoral positioning of the standard denture.

[14] A denture preparation kit including:
the standard denture alignment jig according to any one of [1] to [12];
a standard denture; and
a relining material.

This denture preparation kit includes the standard denture alignment jig according to any one of [1] to [12]; the standard denture having a predetermined shape; and the relining material.

Using the standard denture alignment jig according to any one of [1] to [12], the standard denture is placed in an oral cavity, and the mucous membrane shape in the oral cavity is registered on the relining material applied to the standard denture, whereby preparing a denture.

[15] A method for preparing a denture, the method involving:
retaining a standard denture in the standard denture alignment jig according to any one of [1] to [12];
applying a relining material to an inner surface of the standard denture; and
registering a shape on the relining material applied to the standard denture.

In this method for preparing a denture, the relining material is applied to the inner surface of the standard denture, the standard denture is placed in an oral cavity using the standard denture alignment jig according to any one of [1] to [12], and a shape is registered on the relining material applied to the standard denture.

[16] A method for preparing a denture, involving:

retaining a standard denture in the standard denture alignment jig according to [7] or [8];

applying a relining material to an inner surface of the standard denture;

brining a tip of the rod of the standard denture alignment jig into contact with the lowest point of a maxillary vestibular portion of maxillary and mandibular edentulous jaw models; and registering a shape on the relining material applied to the standard denture.

In this method for preparing a denture, the tip of the rod of the standard denture alignment jig is brought into contact with the lowest point of the maxillary vestibular portion of the maxillary and mandibular edentulous jaw models, whereby adjusting anteroposterior positions of the standard denture easily. p0 [17] A method for preparing a denture, involving:

retaining a standard denture in the standard denture alignment jig according to [7] or [8];

applying a relining material to an inner surface of the standard denture;

brining a tip of the rod of the standard denture alignment jig into contact with the lowest point of a mandibular vestibular portion of maxillary and mandibular edentulous jaw models; and registering a shape on the relining material applied to the standard denture.

In this method for preparing a denture, the tip of the rod of the standard denture alignment jig is brought into contact with the lowest point of the mandibular vestibular portion of the maxillary and mandibular edentulous jaw models, whereby adjusting anteroposterior positions of the standard denture easily.

[18] A method for preparing a denture, involving:

retaining a standard denture in the standard denture alignment jig according to any one of [9] to [12];

applying a relining material to an inner surface of the standard denture;

aligning the horizontal guide of the standard denture alignment jig with an imaginary occlusal plane of maxillary and mandibular edentulous jaw models; and registering a shape on the relining material applied to the standard denture.

In this method for preparing a denture, the horizontal guide of the standard denture alignment jig is brought into contact with the imaginary occlusal plane of the maxillary and mandibular edentulous jaw models, whereby adjusting vertical positions of the standard denture easily.

Advantageous Effects of Invention

With a standard denture alignment jig, a denture preparation kit, and a method for preparing a denture according to an embodiment of the present invention, it is possible to place standard dentures in optimal positions in, for example, the oral cavity of a patient. Accordingly, it is possible to easily prepare a denture with a good fit. Such a denture significantly reduces the burden of a dentist, a dental technician, and a patient.

BRIEF DESCRIPTION OF DRAWINGS

FIG. 1(a) is a plan view, FIG. 1(b) is a side view, and FIG. 1(c) is a front view of an exemplary structure of a standard denture alignment jig according to an embodiment of the present invention.

FIG. 2(a) is a plan view, FIG. 2(b) is a side view, and FIG. 2(c) is a front view of an exemplary structure of a standard denture alignment jig according to an embodiment of the present invention.

FIG. 3(a) is a plan view, FIG. 3(b) is a side view, and FIG. 3(c) is a front view of an exemplary structure of a standard denture alignment jig according to an embodiment of the present invention including a median guide.

FIG. 4(a) is a plan view, FIG. 4(b) is a side view, and FIG. 4(c) is a front view of an exemplary structure of a standard denture alignment jig according to an embodiment of the present invention including a median indicating pin disposed in a slidable manner.

FIG. 5(a) is a plan view, FIG. 5(b) is a side view, and FIG. 5(c) is a front view of an exemplary structure of a standard denture alignment jig according to an embodiment of the present invention including a rod.

FIG. 6(a) is a plan view, FIG. 6(b) is a side view, and FIG. 6(c) is a front view of an exemplary structure of a standard denture alignment jig according to an embodiment of the present invention including a horizontal guide.

FIG. 7(a) is a plan view, FIG. 7(b) is a side view, and FIG. 7(c) is a front view of another exemplary structure of a standard denture alignment jig according to an embodiment of the present invention including a horizontal guide.

FIG. 8 is a side view of the standard denture alignment jig according to an embodiment of the present invention in use.

FIG. 9(a) is a front view and FIG. 9(b) is a side view of the standard denture alignment jig according to an embodiment of the present invention in use.

FIG. 10(a) is a front view and FIG. 10(b) is a side view of the standard denture alignment jig according to an embodiment of the present invention in use.

FIG. 11(a) is a front view and FIG. 11(b) is a side view of the standard denture alignment jig according to an embodiment of the present invention in use.

FIG. 12(a) is a plan view, FIG. 12(b) is a side view, and FIG. 12(c) is a front view of an exemplary structure of a standard denture alignment jig according to an embodiment of the present invention including a rod disposed in a slidable manner.

DESCRIPTION OF EMBODIMENTS (Standard Denture Alignment Jig)

Hereinafter, the present invention will be described in detail with reference to the drawings. In the following description, the terms "perpendicular" and "orthogonal" represents not only a 90-degree angle but also 80- to 100-degree angles. Furthermore, the term "parallel" represents not only "perfectly parallel" but also "plus or minus 10 degrees about a perfect parallel line.

FIG. 1(a) is a plan view, FIG. 1(b) is a side view, and FIG. 1(c) is a front view of an exemplary structure of a standard denture alignment jig according to an embodiment of the present invention. In regard to this standard denture alignment jig, the bottom view is substantially equal to the plan view, and the right side view is substantially symmetric with the left side view.

In FIGS. 1(a) to 1(c), the reference numeral 100 denotes a standard denture alignment jig according to an embodiment of the present invention, and the reference numeral 13 denotes a standard denture retention unit. The standard denture retention unit 13 is provided with a maxillary denture retention groove 15 and a mandibular standard denture retention groove 17. In FIGS. 1(*b*) and 1(*c*), line A-B represents an occlusal plane of standard dentures.

Since the standard denture retention unit 13 is inserted into an oral cavity or the like, the standard denture retention unit 13 is preferably small in size and has sufficient durability. Furthermore, the standard denture retention unit 13 is preferably configured to retain the standard dentures by its appropriate elasticity. Although not limited to the following examples, the standard denture retention unit 13 may include, for example, an acrylic resin, polyamide, polyurethane, polyethylene, polypropylene, or silicon rubber.

The maxillary denture retention groove 15 and the mandibular standard denture retention groove 17 formed in the standard denture retention unit 13 of the standard denture alignment jig 100 may have a structure that enables temporary fixation of a maxillary standard denture 91 and a mandibular standard denture 93 which are to be described. For example, the standard denture retention unit 13 may include an elastic material, and those grooves may be slightly smaller than the standard dentures.

The standard denture alignment jig 100 is used in the following manner. The maxillary standard denture 91 and the mandibular standard denture 93 are respectively fitted in the maxillary denture retention groove 15 and the mandibular standard denture retention groove 17 of the standard denture alignment jig 101, while predetermined occlusion is maintained. Accordingly, the standard denture alignment jig 100 retains a pair of standard dentures while maintaining the predetermined occlusion. The standard denture alignment jig 100 that retains the pair of standard dentures is inserted into a human oral cavity or into an articulator to which maxillary and mandibular edentulous jaw models are fixed, while the predetermined occlusion between the maxillary and mandibular standard dentures is maintained. Therefore, the use of the standard denture alignment jig 100 according to an embodiment of the present invention enables adjustment of positions in an oral cavity or the like, while the predetermined occlusion between the maxillary and mandibular standard dentures is maintained.

Hereinafter described is a standard denture alignment jig that includes a handle. The handle is connected to a standard denture retention unit and may have any shape as long as the handle can be easily retained by a hand. For example, the handle may have a bar shape, a flat plate shape, or a shape with protrusions and recesses that suit fingers. In a case where the handle has a flat plate shape, the plane of the handle may be perpendicular, parallel, or oblique to an occlusal plane of standard dentures. From a viewpoint of providing a function of a horizontal guide which is to be described, the handle preferably has a flat plate shape having the plane parallel to an occlusal plane of standard dentures.

FIG. 2(*a*) is a plan view, FIG. 2(*b*) is a side view, and FIG. 2(*c*) is a front view of an exemplary structure of a standard denture alignment jig according to an embodiment of the present invention. In regard to this standard denture alignment jig, the bottom view is substantially equal to the plan view, and the right side view is substantially symmetric with the left side view.

In FIGS. 2(*a*) to 2(*c*), the reference numeral 101 denotes a standard denture alignment jig according to an embodiment of the present invention that includes a handle, and the reference numeral 11 denotes a handle connected to a standard denture retention unit 13.

The handle 11 of the standard denture alignment jig 101 has a certain length long enough to control a pair of standard dentures from outside a human oral cavity. The handle 11 has a length of, typically, 50 to 200 mm and, preferably, 60 to 180 mm.

It is preferable that incisal edges of maxillary anterior teeth of the standard dentures should be coplanar with and a part of the upper or lower surface of the handle. Particularly, it is preferable that the incisal edges of the maxillary anterior teeth of the standard dentures and a part of the lower surface of the handle should be coplanar. By setting in this manner, according to a position of the upper or lower surface of the handle, it is possible to check and set vertical positions of the maxillary anterior teeth that affect aesthetically.

The handle preferably has a thickness of 1 to 3 mm, and particularly preferably, 2 mm. By setting the thickness of the handle within such a range, it is possible to set a position of the incisal edges of the anterior teeth according to the positional relationship between the handle and the upper lip and/or the lower lip.

The standard denture retention unit 13 is connected to the handle 11, and the connection between those members may be performed by integral molding. Alternatively, the handle 11 and the standard denture retention unit 13 may be detachable.

The standard denture alignment jig 101 is used in the following manner.

FIG. 8 is a view of the standard denture alignment jig according to an embodiment of the present invention in use.

The maxillary standard denture 91 and the mandibular standard denture 93 are respectively fitted in the maxillary denture retention groove 15 and the mandibular standard denture retention groove 17 of the standard denture alignment jig 101, while predetermined occlusion is maintained. Accordingly, the standard denture alignment jig 101 retains a pair of standard dentures while maintaining the predetermined occlusion. The standard denture alignment jig 101 holding the maxillary standard denture 91 and the mandibular standard denture 93 is inserted into a human oral cavity or an articulator to which maxillary and mandibular edentulous jaw models are fixed. Then, the handle 11 is externally controlled so as to adjust positions of the maxillary standard denture 91 and the mandibular standard denture 93.

Hereinafter described is a standard denture alignment jig that includes a median guide. The median guide may be a guide that enables us to check the median line of a standard denture and may be arranged in any position of the alignment jig. The median guide may have any shape. For example, the median guide may be a pin, a protrusion, a groove, or a print disposed on a denture retention unit. Furthermore, a pin, a protrusion, a groove, or a print may be disposed on a handle connected to the denture retention unit. In a case where the median guide is a pin, as described later, the median guide may guide vertical positions of standard dentures by the length of the pin. As a guide for vertical positions, a gauge may be separately disposed in the alignment jig, or a gauge may be disposed in the median guide itself.

FIG. 3(*a*) is a plan view, FIG. 3(*b*) is a side view, and FIG. 3(*c*) is a front view of an exemplary structure of a standard denture alignment jig according to an embodiment of the present invention including a median guide. In regard to this standard denture alignment jig, the bottom view is substantially equal to the plan view, and the right side view is substantially symmetric with the left side view. Components same as those in FIGS. 2(*a*) to 2(*c*) are denoted by the same reference numerals and will not be described.

In FIGS. 3(a) to 3(c), the reference numeral 102 denotes a standard denture alignment jig according to an embodiment of the present invention that includes a median guide, and the reference numeral 21 denotes a median guide connected to a handle 11. The median guide 21 may be formed on either the upper or lower part of the handle 11 or may be formed on both the upper and lower parts of the handle 11 as shown in FIG. 3(b). The median guide 21 may be a pin arranged perpendicular to an occlusal plane as shown in FIGS. 3(a) to 3(c). Alternatively, the median guide 21 may be a protrusion, a groove, or a print. In order to easily adjust positions of standard dentures, the median guide is preferably a pin having a length of, preferably, 30 to 60 mm, and more preferably, 35 to 55 mm. The pin may expand and contract in a multiple-step or stepless manner. A pin having a length in the above range facilitates detection of an inclination of a denture. Particularly, in a case where an articulator is used, a relative position between a predetermined portion of the articulator and one end of a pin is adjusted so that the relative position is used as an index of vertical positions of standard dentures.

This pin (median indicating pin) is preferably attached to the handle 11 slidably in a direction parallel to an occlusal plane of standard dentures.

FIG. 4(a) is a plan view, FIG. 4(b) is a side view, and FIG. 4(c) is a front view of an exemplary structure of a standard denture alignment jig according to an embodiment of the present invention including a median indicating pin disposed in a slidable manner. Components same as those in FIGS. 3(a) to 3(c) are denoted by the same reference numerals and will not be described.

A slide groove 31 is formed in a handle 11, and a median indicating pin 21 is disposed slidably along the groove within a range indicated by symbol C in FIG. 4 (b). In FIGS. 4(a) to 4(c), reference numeral 33 denotes a nut. To explain further, the median indicating pin 21 becomes slidable along the groove 31 when the nut 33 is loosened. When the nut 33 is tightened, the median indicating pin 21 is fixed in an intended position.

The standard denture alignment jig 102 is used in the following manner.

FIG. 9(a) is a front view and FIG. 9(b) is a side view of the standard denture alignment jig according to an embodiment of the present invention in use.

The maxillary standard denture 91 and the mandibular standard denture 93 are respectively fitted in the maxillary denture retention groove 15 and the mandibular standard denture retention groove 17 of the standard denture alignment jig 102, while predetermined occlusion is maintained. Accordingly, the standard denture alignment jig 102 retains a pair of standard dentures while maintaining the predetermined occlusion. Here, the dentures are fitted in such a manner that a median position of the central incisor of each standard denture aligns with the median guide (median indicating pin) 21.

The standard denture alignment jig 102 holding the maxillary standard denture 91 and the mandibular standard denture 93 is inserted into a human oral cavity or an articulator to which maxillary and mandibular edentulous jaw models are fixed. Then, the handle 11 is externally controlled so as to adjust positions of the maxillary standard denture 91 and the mandibular standard denture 93. Since the standard denture alignment jig 102 includes the median guide 21, using this median guide 21 facilitates alignment from outside the oral cavity of a patient or from outside the articulator. In other words, for example, placing a tip of human nose in a straight line with one end and the other end of the median guide makes it possible to adjust positions and horizontal inclination of standard dentures appropriately. The median indicating pin also serves as an index for adjusting positions of standard dentures to appropriate positions in a depth direction in the oral cavity or the articulator. In a case where the median indicating pin is disposed in a slidable manner, a position of the median indicating pin is appropriately adjusted according to the size of a human face or an articulator.

Hereinafter described is a standard denture alignment jig that includes a rod for setting anteroposterior positions of standard dentures in an oral cavity or an articulator. The rod may be placed in any position of the alignment jig. The rod may have any shape. The rod may be disposed on any of a standard denture retention unit, a handle, and a median guide. Since anteroposterior positions of the rod are accurately set by letting the rod contact a face or a portion corresponding to the median line of an articulator to which edentulous jaw models are fixed, the rod is preferably disposed on a median indicating pin or a median guide. The rod may expand and contract in a multiple-step or stepless manner.

FIG. 5(a) is a plan view, FIG. 5(b) is a side view, and FIG. 5(c) is a front view of an exemplary structure of a standard denture alignment jig according to an embodiment of the present invention including a rod attached in a direction orthogonal to a median indicating pin. In regard to this standard denture alignment jig, the bottom view is substantially equal to the plan view, and the right side view is substantially symmetric with the left side view. Components same as those in FIGS. 1(a) to 4(c) are denoted by the same reference numerals and will not be described.

In FIGS. 5(a) to 5(c), the reference numeral 104 denotes a standard denture alignment jig according to an embodiment of the present invention, the reference numerals 41 and 45 denote rods, and the reference numerals 43 and 47 denote contact portions connected to a tip of the rod 41. The rod 41 is attached in a direction orthogonal to a median indicating pin 21 provided on the upper side of a handle 11 (that is, the maxillary side) and in a direction parallel to a longitudinal direction of the handle 11. Furthermore, the rod 45 is attached in a direction orthogonal to the median indicating pin 21 provided on the lower side of the handle 11(that is, the mandibular side) and parallel to the longitudinal direction of the handle 11.

The rods 41 and 45 may be formed in an integrated manner with the median indicating pin. Furthermore, it is preferable that the median indicating pin 21 should be slidably attached to the handle 11 in a direction parallel to an occlusal plane of standard dentures.

The contact portions 43 and 47 are portions that contact a human face or a surface of an articulator but are not always required in the present invention. A tip of a rod may directly contact a human face or a surface of an articulator. Furthermore, the contact portions 43 and 47 may be formed in an integrated manner with the rods 41 and 45.

In the median guide 21, the rods 41 and 45 are preferably attached to the handle 11 slidably in a direction parallel to the occlusal plane of the standard dentures and a direction parallel to a longitudinal direction of the handle 11. FIG. 12(a) is a plan view, FIG. 12(b) is a side view, and FIG. 12(c) is a front view of an exemplary structure of a standard denture alignment jig according to an embodiment of the present invention including a rod disposed in a slidable manner. The rods 42 and 46 are arranged in a direction parallel to an occlusal plane of standard dentures, being slidable within a range indicated by symbol D in FIG. 12 (b).

The standard denture alignment jig 104 is used in the following manner.

FIG. 10(a) is a front view and FIG. 10(b) is a side view of the standard denture alignment jig according to an embodiment of the present invention in use.

The maxillary standard denture 91 and the mandibular standard denture 93 are respectively fitted in the maxillary denture retention groove 15 and the mandibular standard denture retention groove 17 of the standard denture alignment jig 104, while predetermined occlusion is maintained. Here, the dentures are fitted in such a manner that a median position of the central incisor of each standard denture aligns with the median guide (median indicating pin) 21. Accordingly, the standard denture alignment jig 104 retains a pair of standard dentures while maintaining the predetermined occlusion.

The standard denture alignment jig 104 holding the maxillary standard denture 91 and the mandibular standard denture 93 is inserted into a human oral cavity or an articulator to which maxillary and mandibular edentulous jaw models are fixed. Then, the handle 11 is externally controlled so as to adjust positions of the maxillary standard denture 91 and the mandibular standard denture 93. Here, the contact portion 43 on the maxillary side is brought into contact with the subnasal point or the lowest point of the maxillary vestibular portion of the occlusal models. The contact portion 47 on the mandibular side is brought into contact with the mental protuberance or the lowest point of the mandibular vestibular portion of the models. Since the standard denture alignment jig 104 includes the rods 41 and 45, bringing a tip of a rod into contact with a part of the face of a patient or with the articulator makes it easier to adjust positions of the standard dentures to appropriate positions in a depth direction in the oral cavity or the articulator.

Hereinafter described is a standard denture alignment jig including a horizontal guide that indicates an occlusal plane of the standard dentures. The horizontal guide may have any shape as long as the horizontal guide has an element indicating the occlusal plane and may be placed in any position of the standard denture alignment jig. For example, a pin, a blade, a groove, a print, or a plurality of protrusions arranged in parallel with the occlusal plane may be arranged on a denture retention unit, a handle, or a median guide. Moreover, the handle itself connected to the denture retention unit may be used as the horizontal guide. From a viewpoint of visibility, the horizontal guide is preferably a blade disposed in the handle. The blade preferably has a shape that conforms with a face. The blade, or the horizontal guide, is preferably adjustable to a position where the blade is easily seen with respect to a human face or an articulator to which edentulous jaw models are fixed. For example, there is a mechanism that includes a plurality of blades and configured to change angles of the blades while maintaining a parallel state relative to an occlusal plane. Furthermore, the blade may have a slide mechanism that slides anteroposteriorly and vertically.

FIG. 6(a) is a plan view, FIG. 6(b) is a side view, and FIG. 6(c) is a front view of an exemplary structure of a standard denture alignment jig according to an embodiment of the present invention including the horizontal guide that indicates an occlusal plane of standard dentures. Components same as those in FIGS. 1(a) to 5(c) are denoted by the same reference numerals and will not be described.

In FIGS. 6(a) to 6(c), the reference numeral 105 denotes a standard denture alignment jig according to an embodiment of the present invention, and the reference numeral 51 denotes a horizontal guide that indicates an occlusal plane of standard dentures. This horizontal guide 51 is a blade connected to a handle, having a U- or V-shape so as to conform with the shape of a human face or an articulator (in FIGS. 5(a) to 5(c), the horizontal guide 51 has a U-shape). The horizontal guide 51 may be configured to change in shape.

FIG. 7(a) is a plan view, FIG. 7(b) is a side view, and FIG. 7(c) is a front view of another exemplary structure of a standard denture alignment jig according to an embodiment of the present invention including the horizontal guide that indicates an occlusal plane of standard dentures. Components same as those in FIGS. 1(a) to 6(c) are denoted by the same reference numerals and will not be described.

In FIGS. 7(a) to 7(c), the reference numeral 106 denotes a standard denture alignment jig according to an embodiment of the present invention, and the reference numerals 61 and 63 denote blades. The two blades 61 and 63 are horizontal guides indicating the occlusal plane of the standard dentures. The blades 61 and 63 are rotatable about a median indicating pin that functions as a fulcrum. In other words, the blades 61 and 63 are configured to adjust the shape of the horizontal guide by rotating according to the size of a human face or the size of an articulator.

The standard denture alignment jig 105 is used in the following manner. Note that the standard denture alignment jig 106 is used in a similar manner.

FIG. 11(a) is a front view and FIG. 11(b) is a side view of the standard denture alignment jig according to an embodiment of the present invention in use.

The maxillary standard denture 91 and the mandibular standard denture 93 are respectively fitted in the maxillary denture retention groove 15 and the mandibular standard denture retention groove 17 of the standard denture alignment jig 105, while predetermined occlusion is maintained. Here, the dentures are fitted in such a manner that a median position of the central incisor of each standard denture aligns with the median guide (median indicating pin) 21. Accordingly, the standard denture alignment jig 105 retains a pair of standard dentures while maintaining the predetermined occlusion.

The standard denture alignment jig 105 holding the maxillary standard denture 91 and the mandibular standard denture 93 is inserted into a human oral cavity or an articulator to which maxillary and mandibular edentulous jaw models are fixed. Then, the handle 11 is externally controlled so as to adjust positions of the maxillary standard denture 91 and the mandibular standard denture 93. Here, checking anteroposterior and vertical inclinations of the horizontal guide 51 makes it easier to adjust a position of an occlusal plane of the standard dentures to an appropriate position in the oral cavity or the articulator. Furthermore, in the articulator, aligning the horizontal guide 51 with an imaginary occlusal plane of the maxillary and mandibular edentulous jaw models makes it easier to adjust a position of the occlusal plane of the standard dentures to an appropriate position.

(Denture Preparation Kit)

A denture preparation kit according to an embodiment of the present invention includes the standard denture alignment jig and a standard denture, and may also include a relining material.

The standard denture is a ready-made denture having a predetermined shape. For example, a standard denture disclosed in JP 2015-165850 A is employable. Since the standard denture has a predetermined shape, the standard denture is easily fitted to the oral shape of a patient by simply applying a relining material. In other words, the use of a ready-made denture reduces the time for preparing a denture.

A known material is employable as the relining material without any limitation. Examples of the relining material include poly (meth) acrylate resin, polyolefin resin, polyamide resin, polyester resin, polyether resin, polynitrile resin, polyvinyl resin, cellulose resin, fluorine resin, imide resin, and silicon resin.

(Method for Preparing Denture using the Jig and the Kit)

In a method for preparing a denture using the denture preparation kit, first, the standard denture alignment jig according to an embodiment of the present invention is made to retain a standard denture while predetermined occlusion is maintained.

Next, a relining material is applied to an inner surface of this standard denture, and then, as described above, the jig that retains the standard denture is inserted into a human oral cavity or an articulator. Then, the shape is registered on the relining material applied to the standard denture. Accordingly, the inner surface shape of the model set in the human oral cavity or the articulator is registered on the relining material, whereby preparing a denture.

EXAMPLES

Reference Example 1

Maxillary and mandibular edentulous jaw models were attached to a manikin (NISSIM Type. 2, available from Nissin), and maxillary and mandibular complete dentures were prepared by a common method in the following setting positions.

(Setting Positions of Denture)

(1) Horizontal positions of anterior teeth: Align the median line of an edentulous jaw model with a contact point between right and left central incisors of a complete denture (both maxilla and mandibula).

(2) Horizontal positions of molars: Align the median line of an edentulous jaw model with the midpoint that connects the central fovea of right and left first molars of a complete denture (both maxilla and mandibula).

(3) Vertical positions of anterior teeth: In the anterior teeth of the maxillary complete denture, set a distance from a margin of the base to a central incisal edge to 22 mm (measure with a caliper).

(4) Vertical positions of anterior teeth: In the anterior teeth of the mandibular complete denture, set a distance from a margin of the base to a central incisal edge to 20 mm.

(5) Vertical positions of anterior teeth: When the maxillary and mandibular complete dentures are occluded, set a distance from the margin of the base of the maxillary anterior teeth to the margin of the base of the mandibular anterior teeth to 40 mm (the maxillary central incisor perpendicularly covers the mandibular central incisor for 2 mm).

(6) Vertical positions of molars: Make a plane that connects the subnasal point and the tragion (Camper's plane) parallel to a plane that connects the mandibular central incisal edge and the distobuccal cusps of the right and left mandibular second molars.

*A flat plate is placed on the mandibula, and a difference in inclination between the flat plate and the Camper's plane is measured with a protractor.

(7) Anteroposterior positions: Set a distance from the central point of the incisive papilla to the maxillary central incisal edge of the maxillary edentulous jaw model to 9 mm (take a picture and measure the distance in a projection view)

Example 1

Maxillary and mandibular standard dentures, a hard relining material (product name: Tokuyama Rebase III), and an alignment jig were used to prepare complete dentures for ten subjects. Positions of the complete dentures obtained (the aforementioned parameters) were measured. Each parameter was compared with the complete dentures prepared in Reference Example 1 and determined as o or x . Table 1 shows the number of subjects determined as o for each parameter.

The alignment jig used here was one shown in FIGS. 2(a) to 2(c). Each standard denture was set in a standard denture retention unit, and a hard relining material was applied to an inner surface of each standard denture. The standard dentures were inserted into the oral cavity of a manikin. The mucosal surface shape was registered on the relining material, and the relining material was cured, whereby preparing dentures.

Example 2

Dentures were prepared in a similar manner to Example 1 except that an alignment jig used here was one that includes a handle as shown in FIGS. 2(a) to 2(c). At the time of preparation, a median indicating line was aligned with the median line of a manikin.

Example 3

Dentures were prepared in a similar manner to Example 1 except that an alignment jig used here was one shown in FIGS. 3(a) to 3(c). A median indicating pin has a length of 40 mm (both upper and lower length are 20 mm, totally 40 mm, centering on a handle). At the time of preparation, an upper end of a median indicating pin and the subnasal point of a manikin were aligned, and a lower end of the median indicating pin was aligned with the mental protuberance of the manikin (horizontal height of contour).

Example 4

Dentures were prepared in a similar manner to Example 3 except that a horizontal guide shown in FIGS. 6(a) to 6(c) was added to the alignment jig of Example 3. At the time of preparation, the horizontal guide was made parallel to the Camper's plane that connects the subnasal point and the tragion of a manikin.

Example 5

Dentures were prepared in a similar manner to Example 1 except that an alignment jig used here was one shown in FIGS. 6(a) to 6(c). Standard dentures were attached to the alignment jig and inserted into the oral cavity of a manikin.

A median indicating pin was slid in such a manner that anteroposterior positions of the median indicating pin was fixed in positions where the lower lip of the manikin and a standard denture fixing part of the alignment jig slightly contacted with each other. Then, a rod was fixed in a position where the rod contacted the mental protuberance of the manikin. In this state, the standard dentures and an alignment tray were taken out of the oral cavity. The remaining processes were performed in a similar manner to Example 4, whereby preparing dentures.

Comparative Example 1

Without an alignment jig, complete dentures were prepared for ten subjects, using maxillary and mandibular standard dentures and a hard relining material (product name: Tokuyama Rebase III). Positions of the complete dentures obtained were measured in a similar manner to Example 1.

Differences between the complete dentures in Comparative Example 1 and those prepared in Reference Example 1 were as determined in the following manner.

Criterion (1) Horizontal positions of anterior teeth: within 3.0 mm was regarded as o, and more than 3.0 mm was regarded as x;

Criterion (2) Horizontal positions of molars: within 3.0 mm was regarded as o, and more than 3.0 mm was regarded as x;

Criterion (3) Vertical positions of anterior teeth: within ±3.0 mm was regarded as o, and more than ±3.00 mm was regarded as x;

Criterion (4) Vertical positions of anterior teeth: within ±3.0 mm was regarded as o, and more than ±3.0 mm was regarded as x;

Criterion (5) Vertical positions of anterior teeth: within ±5.0 mm was regarded as o, and more than ±5.0 mm was regarded as x;

Criterion (6) Vertical positions of molars: within ±5 degrees was regarded as o, and more than ±5 degrees was regarded as x; and Criterion (7) Anteroposterior positions: within ±2.0 mm was regarded as o, and more than ±2.0 mm was regarded as x.

In addition, as Criterion (8), in regard to an occlusal position of maxillary and mandibular complete dentures attached to a model on an articulator, when a denture had the occlusal position equal to an occlusal position of the complete dentures prepared in Reference Example 1, the denture was regarded as o, and one having a different occlusal position was regarded as x.

TABLE 1

|  | Criterion (1) | Criterion (2) | Criterion (3) | Criterion (4) | Criterion (5) | Criterion (6) | Criterion (7) | Criterion (8) |
|---|---|---|---|---|---|---|---|---|
| Example 1 | 6 | 2 | 2 | 2 | 0 | 2 | 3 | 10 |
| Example 2 | 9 | 8 | 1 | 3 | 1 | 2 | 4 | 10 |
| Example 3 | 8 | 8 | 9 | 8 | 9 | 2 | 3 | 10 |
| Example 4 | 9 | 9 | 9 | 9 | 10 | 7 | 3 | 10 |
| Example 5 | 9 | 8 | 9 | 8 | 10 | 8 | 9 | 10 |
| Comparative Example 1 | 3 | 2 | 0 | 1 | 0 | 0 | 2 | 3 |

REFERENCE SIGNS LIST

100, 101, 102, 103, 104, 105, 106, 107 Standard denture alignment jig
11 Handle
13 Standard denture retention unit
15 Maxillary denture retention groove
17 Mandibular standard denture retention groove
21 Median guide
31 Slide groove
33 Nut
41, 42, 45, 46 Rod
43, 47 Contact portion
51 Horizontal guide
61, 63 Blade
91 Maxillary standard denture
93 Mandibular standard denture

The invention claimed is:

1. A denture preparation kit comprising:
a maxillary standard denture and a mandibular standard denture for a complete denture consisting of the maxillary standard denture and the mandibular standard denture; and
a standard denture alignment jig comprising:
a standard denture retention unit including a maxillary standard denture retention groove for retaining the maxillary standard denture and a mandibular standard denture retention groove for retaining the mandibular standard denture;
a handle connected to the standard denture retention unit; and
a horizontal guide indicating an occlusal plane of the maxillary standard denture and the mandibular standard denture retained by the standard denture retention unit,
wherein
the standard denture retention unit is configured to retain the maxillary standard denture and the mandibular standard denture while maintaining occlusion between the maxillary standard denture and the mandibular standard denture,
the handle has a thickness, the thickness of the handle is 1 to 3mm and a flat plate shape with an upper surface and a lower surface being parallel to each other,
the standard denture retention unit and the handle are connected such that an occlusal plane, formed when the maxillary standard denture and the mandibular standard denture are retained by the standard denture retention unit in the state of the occlusion maintaining, and the upper surface or the lower surface of the handle are parallel to the occlusal plane,
the standard denture retention unit is configured so that the incisal edge of the maxillary anterior teeth of the maxillary standard denture can be coplanar with a part of the lower surface of the handle,
the handle includes a median guide indicating a median position of a central incisor of the maxillary standard denture and the mandibular standard denture retained by the standard denture retention unit, the median guide is a median indicating pin disposed perpendicular to the occlusal plane of the maxillary standard denture and the mandibular standard denture retained by the standard denture retention unit, and the horizontal guide is a blade connected to the handle, and the blade is rotatable about the median indicating pin that functions as a fulcrum.

2. The denture preparation kit according to claim 1, wherein the median indicating pin includes a rod connected to one end or both ends of the median indicating pin in a direction orthogonal to the median indicating pin.

3. The denture preparation kit according to claim 2, wherein the rod is formed in an integrated manner with the median indicating pin.

\* \* \* \* \*